United States Patent
Imamura et al.

(10) Patent No.: US 8,705,226 B2
(45) Date of Patent: Apr. 22, 2014

(54) CAPACITOR HAVING A CHARACTERIZED ELECTRODE AND METHOD FOR MANUFACTURING SAME

(75) Inventors: Keisuke Imamura, Osaka (JP); Kouichi Kojima, Osaka (JP)

(73) Assignee: Panasonic Corporation, Osaka (JP)

( * ) Notice: Subject to any disclaimer, the term of this patent is extended or adjusted under 35 U.S.C. 154(b) by 231 days.

(21) Appl. No.: 13/063,946

(22) PCT Filed: Sep. 17, 2009

(86) PCT No.: PCT/JP2009/004667
§ 371 (c)(1),
(2), (4) Date: Mar. 15, 2011

(87) PCT Pub. No.: WO2010/032462
PCT Pub. Date: Mar. 25, 2010

(65) Prior Publication Data
US 2011/0170229 A1   Jul. 14, 2011

(30) Foreign Application Priority Data
Sep. 18, 2008   (JP) ................................. 2008-239130

(51) Int. Cl.
*H01G 9/00* (2006.01)
(52) U.S. Cl.
USPC ........................................................... 361/502
(58) Field of Classification Search
USPC ........................................................... 361/502
See application file for complete search history.

(56) References Cited

U.S. PATENT DOCUMENTS

| | | | | |
|---|---|---|---|---|
| 4,110,815 A | * | 8/1978 | Frade et al. | 361/524 |
| 5,431,971 A | * | 7/1995 | Allegret et al. | 428/148 |
| 5,586,001 A | * | 12/1996 | Amano et al. | 361/525 |
| 6,191,935 B1 | | 2/2001 | Okamura et al. | |
| 6,359,769 B1 | * | 3/2002 | Mushiake et al. | 361/502 |
| 6,447,555 B1 | | 9/2002 | Okamura et al. | |
| 6,540,900 B1 | * | 4/2003 | Kinard et al. | 205/153 |
| 6,781,817 B2 | * | 8/2004 | Andelman | 361/503 |
| 6,808,845 B1 | | 10/2004 | Nonaka et al. | |

(Continued)

FOREIGN PATENT DOCUMENTS

| | | | |
|---|---|---|---|
| JP | 02240910 A | * | 9/1990 |
| JP | 11-121301 A | | 4/1999 |

(Continued)

OTHER PUBLICATIONS

International Search Report for Application No. PCT/JP2009/004667, Dec. 22, 2009, Panasonic Corporation.

*Primary Examiner* — David M Sinclair
(74) *Attorney, Agent, or Firm* — RatnerPrestia

(57) ABSTRACT

A capacitor includes a film previously provided on both sides or one side of a collector by anodizing or the like, further a conductive layer provided on the film, and a polarizable electrode layer as an electrode portion on the conductive layer. Thus, the capacitor suppresses the reaction between a driving electrolyte and the collector after a long time of use because the reactivity between the film previously provided on both sides or one side of the collector and the driving electrolyte is low. Furthermore, since the conductive layer is provided, it is possible to reduce an initial contact resistance on the surface of the collector, and to enhance an effect of suppressing performance deterioration by the film.

20 Claims, 4 Drawing Sheets

(56) References Cited

U.S. PATENT DOCUMENTS

| | | | |
|---|---|---|---|
| 7,046,503 B2* | 5/2006 | Hinoki et al. | 361/502 |
| 7,924,548 B2* | 4/2011 | Yamada et al. | 361/502 |
| 8,274,780 B2* | 9/2012 | Watanabe et al. | 361/502 |
| 2002/0003689 A1* | 1/2002 | Sakai et al. | 361/525 |
| 2002/0080558 A1 | 6/2002 | Nonaka et al. | |
| 2002/0138958 A1 | 10/2002 | Nonaka et al. | |
| 2008/0130202 A1* | 6/2008 | Ro et al. | 361/516 |

FOREIGN PATENT DOCUMENTS

| | | |
|---|---|---|
| JP | 2002170747 A * | 6/2002 |
| JP | 3719570 B2 | 9/2005 |
| JP | 2007-250376 A | 9/2007 |
| JP | 2007-250376 A | 9/2007 |
| WO | WO 99/38177 A1 | 7/1999 |
| WO | WO 2007094366 A1 * | 8/2007 |

* cited by examiner

US 8,705,226 B2

CAPACITOR HAVING A CHARACTERIZED ELECTRODE AND METHOD FOR MANUFACTURING SAME

This application is a U.S. National Phase Application of PCT International Application PCT/JP2009/004667.

TECHNICAL FIELD

The present invention relates to a capacitor used for energy regeneration of hybrid cars and fuel cell vehicles, or as a power source of electronic devices.

BACKGROUND ART

Conventionally, a capacitor has been used as a power source of many electronic devices for its good response with respect to charge and discharge. Among capacitors, in particular, electric double layer capacitors have high energy density and are used also for energy storage.

In electric double layer capacitors, due to a spontaneous oxide film formed on a surface of a collector made of a metal foil in air environment, contact resistance on the surface of the collector is increased. Therefore, a configuration in which hard carbon particles are compression-bonded between a collector and a polarizable electrode layer in order to suppress the increase of the contact resistance is disclosed. With this configuration, a distance between the carbon particles entering the spontaneous oxide film and the surface of the collector becomes shorter, allowing a current to pass therethrough. Thus, the contact resistance on the surface of the collector can be reduced.

Note here that an example of conventional art information related to this application includes Patent Document 1.

However, when a capacitor is used for a long time, a compound generated as a result of a reaction between the collector and an electrolytic solution is attached on the surface of the collector that is brought into contact with the electrolytic solution through a gap of a layer of carbon particles. This compound increases the contact resistance (direct current resistance) between an electrode portion and the surface of the collector. This is still a factor causing performance deterioration when a conventional capacitor is used for a long time.

Furthermore, performance deterioration becomes remarkable when the capacitor is used in high-temperature conditions. In the future, when capacitors are used for a vehicle-mounted power source and the like, it is assumed that charge and discharge are carried out in a high temperature car body. Therefore, it is also necessary to enhance the reliability of a capacitor in high-temperature conditions.

CITATION LIST

[Patent Document 1] Official Gazette of U.S. Pat. No. 3,719,570

SUMMARY OF THE INVENTION

The present invention provides a capacitor in which performance deterioration after a long time of use is suppressed. The present invention provides a capacitor including an element produced by winding or laminating a positive electrode and a negative electrode and a separator interposed between the positive electrode and the negative electrode, each one of both the positive electrode and the negative electrode including an electrode portion made mainly of a carbon material on a surface of a collector made of a metal, and an outer case for accommodating the element and a driving electrolyte. In the capacitor, a film that is different from a spontaneous oxidation film of a metal constituting the collector is formed on at least a part of a surface of the collector of at last one of the positive electrode and the negative electrode, a conductive layer is formed on the film, and the electrode portion is formed on the conductive layer.

With this configuration, in the capacitor in accordance with the present invention, the film formed on the surface of the collector contains phosphorus and a metal constituting the collector, and therefore the film is chemically inactive with the driving electrolyte. It is possible to suppress the increase of a direct current resistance (DCR) corresponding to a contact resistance on the surface of the collector, which is caused by a compound generated by a reaction between the collector and the driving electrolyte and attached to the collector after the capacitor is used for a long time. Furthermore, since the conductive layer is provided on the film, a part of the conductive layer enters the film (an anchor effect), and the film is formed in such a manner that it is brought into contact with the surrounding of the entering conductive layer. Therefore, an effect of suppressing the reaction between the electrolytic solution and the collector by the film can be enhanced.

Furthermore, when the thickness of the film provided on each collector is not more than about 140 Å, by the physical property of the film, the conductive layer enters the film well or penetrates the film, so that the conductive layer is brought into contact with the surface of the collector. Therefore, it is possible to reduce the initial DCR as compared with a conventional configuration in which a conductive layer is provided on the surface of a collector provided with a spontaneous oxide film.

DETAILED DESCRIPTION OF THE PREFERRED EMBODIMENTS

Hereinafter, an electric double layer capacitor among capacitors in accordance with an exemplary embodiment of the present invention is described with reference to drawings. However, the present invention is not limited to the content of the below-mentioned exemplary embodiment.

(Exemplary Embodiment)

Figure 1:
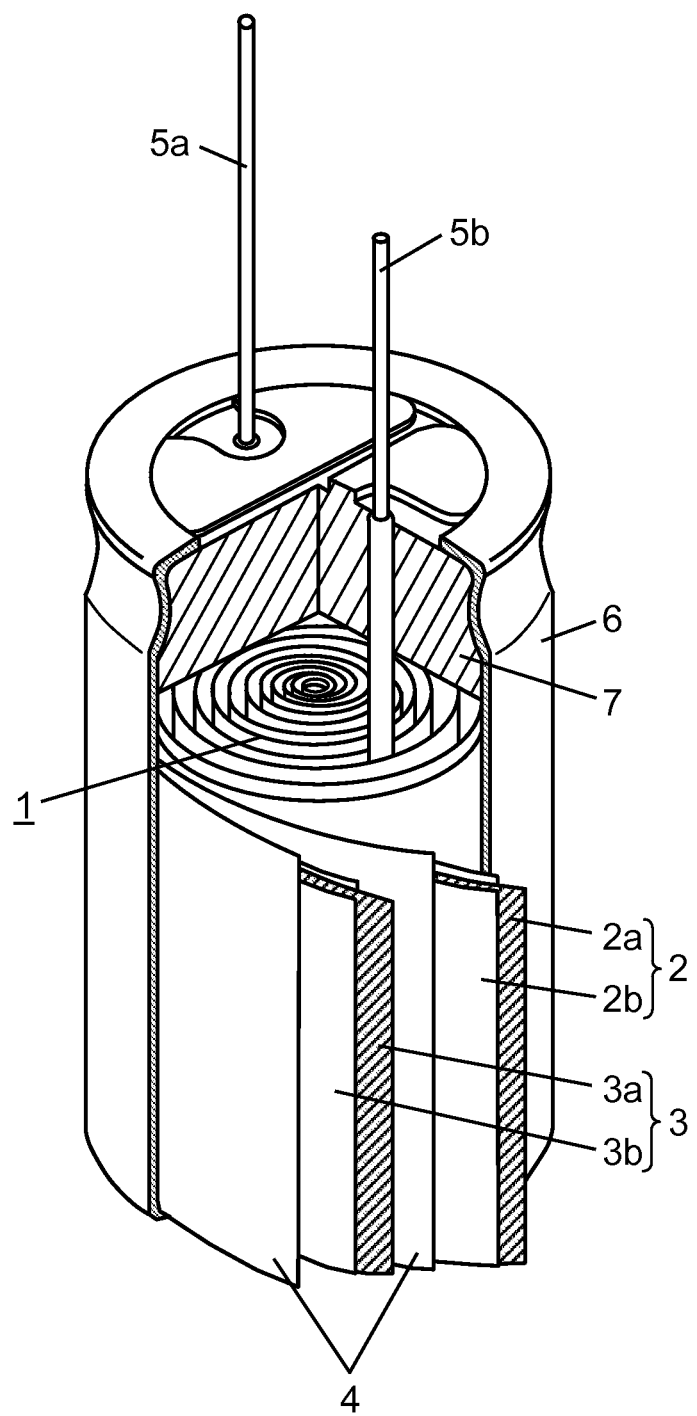
FIG. 1 is a partially cut-away perspective view showing a capacitor in accordance with an exemplary embodiment of the present invention.

FIG. 1 is a partially cut-away perspective view showing a capacitor in accordance with an exemplary embodiment of the present invention.

In FIG. 1, element 1 is formed by winding positive electrode 2 and negative electrode 3 for adsorbing and desorbing ions, and separator 4 which is interposed between positive electrode 2 and negative electrode 3 and which insulates positive electrode 2 and negative electrode 3 from each other. Lead wire 5a of the positive electrode and lead wire 5b of the negative electrode as lead terminals are provided to positive electrode 2 and negative electrode 3 of element 1, respectively. Element 1 and a driving electrolyte (not shown) are accommodated in outer case 6 having a bottom. An open end portion of outer case 6 is sealed with sealing member 7 such that lead wires 5a and 5b are exposed. Thus, a capacitor is configured.

Positive electrode 2 and negative electrode 3 are formed by coating polarizable electrode layer 2b of the positive electrode and polarizable electrode layer 3b of the negative electrode as electrode portions, each of which is mainly made of activated carbon, on the front and back surfaces of collector 2a of the positive electrode and collector 3a of the negative electrode. Collectors 2a and 3a are made of, for example, aluminum foil having a thickness of about 20 μm.

Note here that the dimensions of members of positive electrode 2 and negative electrode 3 may be different from each other, but materials of the members constituting positive electrode 2 and negative electrode 3 are substantially the same as each other. Therefore, hereinafter, the configuration of an electrode in this exemplary embodiment is described by mainly using positive electrode 2.

Figure 2:
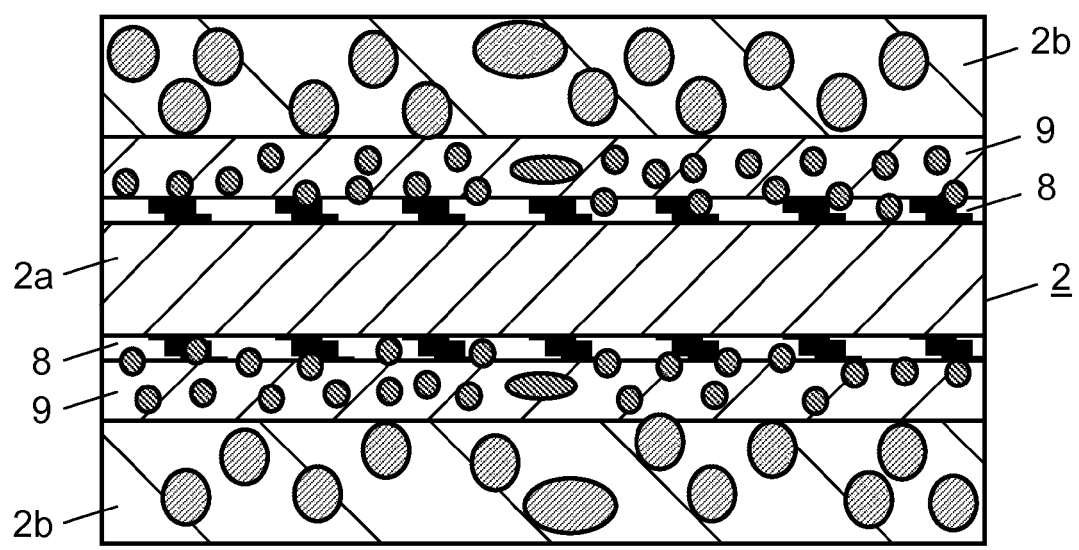
FIG. 2 is a sectional view in a vertical direction showing a positive electrode of a capacitor in accordance with an exemplary embodiment of the present invention.

FIG. 2 is a sectional view in a vertical direction showing a positive electrode of a capacitor in accordance with an exemplary embodiment of the present invention.

In FIG. 2, for a material of collector 2a, a valve metal is used. Examples of the valve metal include aluminum, tantalum, titanium, and the like. Furthermore, an alloy including such elements and generating a valve operation, for example, an aluminum alloy containing titanium may be used. However, kinds of metals are not particularly limited. The most preferable metal is high purity aluminum.

It is further preferable that the surface of the aluminum foil is roughened. When the surface is roughened, the contact area between collector 2a and polarizable electrode layer 2b is increased, thus improving the conductivity and strengthening the bonding with members provided on the surface of collector 2a. Examples of the roughening method include electrolytic etching in a hydrochloric acid etching solution, chemical and/or electrical etching in an acidic solution, and the like, but the method is not particularly limited.

In FIG. 2, in positive electrode 2 of a capacitor in this exemplary embodiment, film 8 containing phosphorus and aluminum is formed on both sides of collector 2a. Furthermore, conductive layers 9 are formed on films 8.

Film 8 is formed by immersing collector 2a in a solution, or by subjecting collector 2a to anodization in a solution or to thermal oxidation. When film 8 is formed by immersing collector 2a and subjecting collector 2a to anodization in a solution, it is desirable to use a solution containing a phosphorus compound. In addition, a solution containing a boron compound or a solution containing an adipic acid compound may be used. When such solutions are used, the same effect can be obtained as in the case where a solution containing a phosphorus compound is used. Furthermore, when a boron compound or adipic acid is used for anodization, a film that is more dense than a film containing phosphorus and a metal constituting a collector can be obtained. The film obtained from a solution of a boron compound and a film obtained from a solution of an adipic acid compound are similar to each other in physical property and performance of suppressing deterioration that is an advantage of the present invention. However, both films have higher reactivity with water than that of phosphorus. Therefore, it is preferable that a thin film containing phosphorus is coated on the film including boron or adipic acid and a collector in order to enhance the water resistant property.

Furthermore, as a solution used for anodization, more preferably, a solution such as an aqueous solution of ammonium phosphate, dilute phosphoric acid, ammonium pentaborate, or ammonium adipate can be used.

A part of aluminum in collector 2a, which has been immersed in the above-mentioned solution and anodized, is reacted with phosphorus and the like in a solution. Thus, film 8 having low reactivity with a driving electrolyte is formed.

This exemplary embodiment describes film 8 containing phosphorus and aluminum. However, as mentioned above, the composition of the film differs depending on solutions to be used in anodization, and differs depending on metals constituting collector 2a. Specific compositions of film 8 containing phosphorus and aluminum may include $Al(PO4)$, $Al2(HPO4)3$, $Al(H2PO4)3$, and the like, but the composition is not particularly limited thereto.

Furthermore, film 8 of this exemplary embodiment is different from a spontaneous oxide film that is formed by natural oxidation, and exhibits low reactivity with respect to a driving electrolyte to be used.

Materials of conductive layer 9 may include carbon materials, conductive organic polymer materials, and metallic oxide such as ruthenium oxide, which are conductive materials (not shown). The carbon materials include carbon black, graphite powder, activated carbon, or the like. The conductive organic polymer materials include polyacetylene, polypyrrole, polyacene, and the like. Preferably, a carbon material is used. More preferably, carbon black is used, and further preferably, acetylene black that is one type of carbon black is used. However, the conductive material is not particularly limited to the above-mentioned materials.

Furthermore, a formation method of conductive layer 9 include a method of coating conductive paste (not shown) containing a conductive material on the surface of collector 2a, or vapor depositing the conductive material so as to form a sheet containing the conductive material, and pressing thereof so as to bring collector 2a and conductive layer 9 into close contact with each other. However, the formation method for conductive layer 9 is not particularly limited.

The reactivity between film 8 formed by the above-mentioned method and a driving electrolyte is low. That is to say, film 8 is inactive. Therefore, when film 8 is provided on the surface of collector 2a, it is possible to suppress a phenomenon that a compound generated by a reaction between a collector and a driving electrolyte is attached continuously on the surface of the collector and increases DCR on the surface of the collector, which occurs conventionally after a long time of use of a capacitor. As a result, it is possible to suppress performance deterioration after a long time of use of a capacitor. In addition, it is possible to suppress gas generated by degradation of the driving electrolyte.

Furthermore, in the present invention, conductive layer 9 is provided on film 8, and they are pressed. Consequently, as compared with a configuration of Patent Document 1 in which conductive layer 9 is allowed to enter a spontaneous oxide film, even if film 8 having a larger thickness than that of a spontaneous oxide film is formed, when the thickness is not more than about 140 Å, conductive layer 9 enters deeper. Alternatively, conductive layer 9 can penetrate film 8 and be brought into contact with collector 2a. Thus, conductive layers 9 energizing collector 2a can be provided in a larger amount than conventionally. Therefore, an initial DCR of collector 2a can be reduced. Naturally, even if the thickness of film 8 is not less than 140 Å, an effect of suppressing initial DCR increased by the formation of film 8 can be obtained by providing conductive layer 9. Also as compared with a configuration in which conductive layer 9 is provided on a spontaneous oxide film having the same thickness, the initial DCR can be reduced more in the configuration of this exemplary embodiment.

In addition, when conductive layer 9 enters film 8 containing phosphorus and aluminum, film 8 having low reactivity with a driving electrolyte is formed around entering conductive layer 9 such that film 8 is brought into close contact with conductive layer 9. Consequently, a surface area of the collector that is brought into contact with an electrolytic solution via a gap of conductive layer 9 entering film 8 is reduced. Therefore, an amount of compounds generated by a reaction between the driving electrolyte and collector 2a can be reduced. Furthermore, by disposing conductive layer 9, the conductivity between collector 2a and polarizable electrode layer 2b is enhanced, and then the increase in DCR of collector 2a can be suppressed. Therefore, an effect of suppressing performance deterioration can be enhanced.

A spontaneous oxide film formed on the surface of a valve metal in air environment is usually one of the factors of inhibiting the conductivity between collector 2a and polarizable electrode layer 2b. Therefore, a spontaneous oxide film or the like is generally removed. Furthermore, the thickness of a spontaneous oxide film that is formed without intension is usually less than 30 Å. However, in this exemplary embodiment, film 8 that is chemically inactive and different from a spontaneous oxide film is intentionally provided on the surface of collector 2a, and conductive layer 9 is provided between film 8 and polarizable electrode layer 2b. This makes it possible to suppress performance deterioration after a long time of use and to reduce initial DCR. Since film 8 of this exemplary embodiment is provided intentionally, film 8 having a thickness of not less than 30 Å, which is difficult to be formed by a spontaneous oxide film, can be formed on the surface of the collector.

Incidentally, FIG. 2 is a schematic view, and therefore does not show the above-mentioned concavity and convexity provided on the surface of collector 2a by etching or a state in which conductive layer 9 enters film 8.

As mentioned above, in this exemplary embodiment, as collector 2a, aluminum foil whose surface is etched is used. In the present invention, the configuration of collector 2a is not limited to an etched one, but by providing film 8 on an etched aluminum foil, extremely dense film 8 can be provided, so that the resistance to physical deterioration such as peeling can be obtained even if it is used in a high temperature electrolytic solution.

Furthermore, collector 2a needs to have such a tensile strength that it does not break when positive electrode 2 is wound. On the other hand, since a large amount of activated carbon (not shown) is required to be filled in outer case 6 having a constant volume, collector 2a is thin as possible. Therefore, it is desirable that the thickness of collector 2a is 10 µm to 50 µm. In this exemplary embodiment, a foil-shaped metal is used for collectors 2a and 3a, but the shape of collector 2a is not limited to this.

In this exemplary embodiment, the configuration of the present invention is specifically described with reference to positive electrode 2 shown in FIG. 2, but the same configuration can be employed for negative electrode 3. Furthermore, in this exemplary embodiment, film 8 and conductive layer 9 are provided on the front and back surfaces of collectors 2a and 3a, but places on which film 8 and conductive layer 9 are disposed are not particularly limited thereto. The effect of the present invention can be obtained in the configuration in which film 8 and conductive layer 9 are provided on one surface of one of the electrodes.

In FIG. 1, for separator 4, a porous and insulating material is used. Examples of porous and insulating materials include cellulose-based paper, polypropylene, polyethylene terephthalate (PET), polyimide, and the like. Furthermore, separator 4 is disposed in such a manner that it is intervened between positive electrode 2 and negative electrode 3. Separator 4 needs to have such a tensile strength that it does not break when it is wound together with positive electrode 2 and negative electrode 3. In addition, in order to fill much activated carbon in outer case 6 having a predetermined volume, it is desirable that the thickness of separator 4 is 10 µm to 50 µm. Note here that materials and dimension of separator 4 are not necessarily limited to the above.

Lead wires 5a and 5b are connected to a portion in positive electrode 2 and negative electrode 3 in which conductive layer 9 and polarizable electrode layers 2b and 3b are not formed, that is, exposed surfaces of collector 2a and collector 3a, and connected to an external circuit. Therefore, in order to reduce the connection resistance with respect to collector 2a and collector 3a as possible, for example, lead wires 5a and 5b use metal such as aluminum or copper. However, the material is not limited to the above-mentioned materials. Furthermore, means of leading each electrode out of element 1 is not limited to lead wires 5a and 5b.

As a base material for outer case 6, for example, aluminum or stainless steel can be used from the viewpoint of the processing property, but the material is not limited. Note here that the shape of outer case 6 is not limited to a cylindrical shape as shown in FIG. 1. Any shapes can be employed as long as they have a bottom, and the shape may be, for example, a rectangular cylindrical shape.

Incidentally, for the driving electrolyte (not shown), at least one of propylene carbonate (PC), ethylene carbonate (EC), dimethyl carbonate (DMC), and the like, can be used as a solvent, and at least one of tetraethylammonium tetrafluoroborate (TEABF4), triethylmethylammonium tetrafluoroborate (TEMABF4), 1-ethyl-3-methyl imidazolium tetrafluoroborate (EMIBF4), 1-ethyl-2,3-dimethyl imidazolium tetrafluoroborate (EDMIBF4), 1,2,3-trimethyl imidazolium tetrafluoroborate (TMIBF4), 1,3-dimethyl imidazolium tetrafluoroborate (DMIBF4), and the like, can be used as an electrolyte. However, a solvent and an electrolyte are not particularly limited.

Sealing member 7 is disposed inside an open end of outer case 6 in such a manner that sealing member 7 is brought into close contact with the inner peripheral surface of outer case 6. Sealing member 7 is subjected to drawing process to a part of the inner surface of the open end of outer case 6 that is in contact with sealing member 7, from the outer peripheral surface of outer case 6 to the inside of outer case 6. With the drawing process, sealing member 7 is fixed to the disposed position. Furthermore, bending process toward the inside of outer case 6 is carried out to a part of the open end portion of outer case 6 protruding from sealing member 7 to the outside, thus strengthening the fixing strength of sealing member 7. Furthermore, in this exemplary embodiment, in order for lead wires 5a and 5b connected to element 1 to penetrate sealing member 7 and to be connected to the external circuit, a through hole is provided in a part of sealing member 7. Note here that for sealing member 7, for example, butyl rubber is used, but material is not particularly limited.

(Performance Evaluation Test 1)

Hereinafter, the content of performance evaluation test 1 that has been carried out based on a plurality of samples and comparative examples in accordance with the present invention.

Firstly, configurations and production methods of a positive electrode and a negative electrode in a capacitor of sample 1 are described.

Film 8 containing phosphorus and aluminum is formed on both sides of the surfaces of collectors 2a and 3a. Then, conductive layer 9 is formed on film 8. Film 8 is provided by immersing aluminum foil, which has a size of about 15 cm×20 cm and a thickness of 20 μm and which has been immersed in sulfuric acid so as to remove a spontaneous oxide film and etched so as to roughen the surface, in an aqueous solution of ammonium phosphate (PM) and anodizing at an anodization voltage of 0.5 V. Herein, when the concentration of the PM aqueous solution is set to 0.5% to 10%, an excellent film containing phosphorus and aluminum and having a thickness about 7 Å can be provided. When the concentration is lower than the lower limit of the above-mentioned concentration range, a sufficient film cannot be formed due to a shortage of phosphorus in the solution. When the concentration exceeds the upper limit, pH of the PM aqueous solution becomes lower, so that a collector of the positive electrode may corrode during the formation of the film.

Furthermore, when an electric current at the time of anodization treatment is set to 0.1 Å to 5 Å, an excellent film can be provided efficiently. The speed of the anodization treatment is attributable to the size of an electric current at the time of anodization. As the electric current value is larger, the anodization can be carried out more rapidly. However, when an electric current value exceeds the upper limit of the above-mentioned electric current value range, the speed of the anodization is too fast, resulting in forming an extremely rough film. As a result, the effect of the present invention cannot be obtained.

Note here that it is desirable that a voltage holding time after a voltage reaches the anodization voltage is not less than 30 seconds. As the time is longer, a more excellent film containing a phosphorus compound can be provided.

For a conductive paste that is a material of conductive layer 9, acetylene black, one type of carbon black, having average particle diameter D50 of primary particles of 50 nm is used as a conductive material. Furthermore, ammonium salt of carboxymethylcellulose (hereinafter, referred to as CMC) is used as a binder, and water is used as a solvent.

Acetylene black as a conductive material, ammonium salt of CMC as a binder, and water are kneaded and dispersed at a mixing rate of acetylene black to ammonium salt of CMC of 4:1. It is desirable that the mixing rate of acetylene black to ammonium salt of CMC is 2:1 to 10:1. When the mixing rate of acetylene black is smaller than 2, the contact resistance between collectors 2a and 3a and polarizable electrode layers 2b and 3b become large, respectively, so that the effect of the present invention cannot be obtained. Furthermore, the mixing rate of acetylene black is larger than 10, it becomes difficult to knead and disperse acetylene black, ammonium salt of CMC and water. As a result, a conductive paste cannot be obtained.

A conductive paste is coated on collectors 2a and 3a provided with a film containing a phosphorus compound so that the thickness of conductive layer 9 is 5 μm per one side by using a coater. That is to say, the conductive paste is coated so that the thickness of collectors 2a and 3a having film 8 and conductive layer 9 on the surfaces thereof is 30 μm after both sides are coated. Then, the coated conductive paste is dried at 90° C. to remove water as a dispersion medium. Thereafter, collectors 2a and 3a having film 8 and conductive layer 9 on the surfaces thereof are pressed by a roll press machine, and thereby the thickness of collectors 2a and 3a having film 8 and conductive layer 9 on the surface thereof is made to be about 22 μm.

By coating an electrode paste on the thus produced collectors 2a and 3a, polarizable electrode layers 2b and 3b are formed.

Firstly, as a material of the electrode paste, activated carbon, which has been subjected to alkaline activation with potassium hydroxide (KOH) and which has a specific surface area of 2000 m2/g and an average particle diameter D50 of 3 μm, is used. Furthermore, as a conductivity-imparting agent, acetylene black that is one type of carbon black having average particle diameter D50 of 50 nm is used. As the binder, a water dispersing agent of ammonium salt of CMC and polytetrafluoroethylene (PTFE) is used. These materials are mixed in a solid weight ratio of about 85:8:5:2, and water as a dispersion medium is added, which are kneaded and dispersed. In this way, an electrode paste is prepared. Note that the weight ratio of the solid part in an electrode paste is made to be about 30 weight %.

The thus obtained electrode paste is coated on both sides of the surfaces of collectors 2a and 3a of positive electrode 2 and negative electrode 3 by using a coater so as to form polarizable electrode layers 2b and 3b. Note here that the electrode paste is coated so that the thickness of polarizable electrode layers 2b and 3b is about 34 μm per one side. That is to say, the electrode paste is coated while the coating condition is adjusted so that the thickness of positive electrode 2 and negative electrode 3 becomes 90 μm.

Then, the coated conductive paste is dried at 90° C. to remove water as a dispersion medium. The thus obtained positive electrode 2 and negative electrode 3 are pressed by using a roll press machine. At this time, they are pressed so that the thicknesses of polarizable electrode layers 2b and 3b after pressing become about 90% of the thicknesses of polarizable electrode layers 2b and 3b before pressing. That is to say, after pressing, the thickness of positive electrode 2 and negative electrode 3 is about 85 μm, and the thickness of polarizable electrode layers 2b and 3b is about 63 μm. In this state, the density of polarizable electrode layers 2b and 3b is about 0.55 g/cm3.

The thus produced positive electrode 2 and negative electrode 3 are cut into a size of 4 cm×10 cm. Then, a lead wire made of aluminum is attached to each of collectors 2b and 3b, and positive electrode 2, negative electrode 3 and separator 4 are wound such that positive electrode 2 faces negative electrode 3 with separator 4 sandwiched therebetween. As separator 4, cellulose paper having a thickness of 35 μm and a density of 0.45 g/cm3 is used. Thus, element 1 is produced.

Then, element 1 is immersed in a driving electrolyte, so that positive electrode 2, negative electrode 3 and separator 4 are impregnated with the driving electrolyte. The driving electrolyte to be used is a solution obtained by dissolving 1-ethyl-2,3-dimethyl imidazolium tetrafluoroborate in a mixed solvent of propylene carbonate and dimethyl carbonate so that the concentration becomes 1.0 M.

Finally, element 1 including positive electrode 2, negative electrode 3, and separator 4 is inserted into cylindrical outer case 6 having a bottom, and sealed by using sealing member 7. Thus, a capacitor of sample 1 is produced.

A capacitor of sample 2 is produced in the same configuration as that of the capacitor of sample 1 except that a film containing phosphorus and aluminum and having a thickness of about 14 Å is formed on the surfaces of the collectors by carrying out anodization at an anodization voltage of 1 V in the production of the capacitor of sample 1.

A capacitor of sample 3 is produced in the same configuration as that of the capacitor of sample 1 except that a film containing phosphorus and aluminum and having a thickness of about 42 Å is formed on the surfaces of the collectors by subjecting the collectors to anodization at an anodization voltage of 3 V in the production of the capacitor of sample 1.

A capacitor of sample 4 is produced in the same configuration as that of the capacitor of sample 1 except that a film containing phosphorus and aluminum and having a thickness of about 70 Å is formed on the surfaces of the collectors by subjecting the collectors to anodization at an anodization voltage of 5 V in the production of the capacitor of sample 1.

A capacitor of sample 5 is produced in the same configuration as that of the capacitor of sample 1 except that a film containing phosphorus and aluminum and having a thickness of about 140 Å is formed on the surfaces of the collectors by subjecting the collectors to anodization at an anodization voltage of 10 V in the production of the capacitor of sample 1.

A capacitor of sample 6 is produced in the same configuration as that of the capacitor of sample 1 except that a film containing phosphorus and aluminum and having a thickness of about 420 Å is formed on the surfaces of the collectors by subjecting the collectors to anodization at an anodization voltage of 30 V in the production of the capacitor of sample 1.

A capacitor of comparative example 1 is produced in the same configuration as that of sample 1 except that anodization treatment and formation of a conductive layer are not carried out with respect to the collectors in the production of the capacitor of sample 1.

A capacitor of comparative example 2 is produced in the same configuration as that of sample 1 except that only coating of a conductive layer is carried out but film formation by anodization is not carried out with respect to the surfaces of the collectors in the production of the capacitor of sample 1.

A capacitor of comparative example 3 is produced in the same configuration as that of sample 1 except that a film containing phosphorus and aluminum and having a thickness of about 14 Å is formed on the surfaces of the collectors by carrying out anodization at an anodization voltage of 1 V, and a conductive layer is not formed in the production of the capacitor of sample 1.

A capacitor of comparative example 4 is produced in the same configuration as that of comparative example 3 except that a film containing phosphorus and aluminum and having a thickness of about 42 Å is formed on the surfaces of the collectors by carrying out anodization at an anodization voltage of 3 V in the production of the capacitor of comparative sample 3.

A capacitor of comparative example 5 is produced in the same manner as in comparative example 3 except that a film containing phosphorus and aluminum and having a thickness of about 70 Å is formed on the surfaces of the collectors by carrying out anodization at an anodization voltage of 5 V in the production of the capacitor of comparative sample 3.

Figure 3:
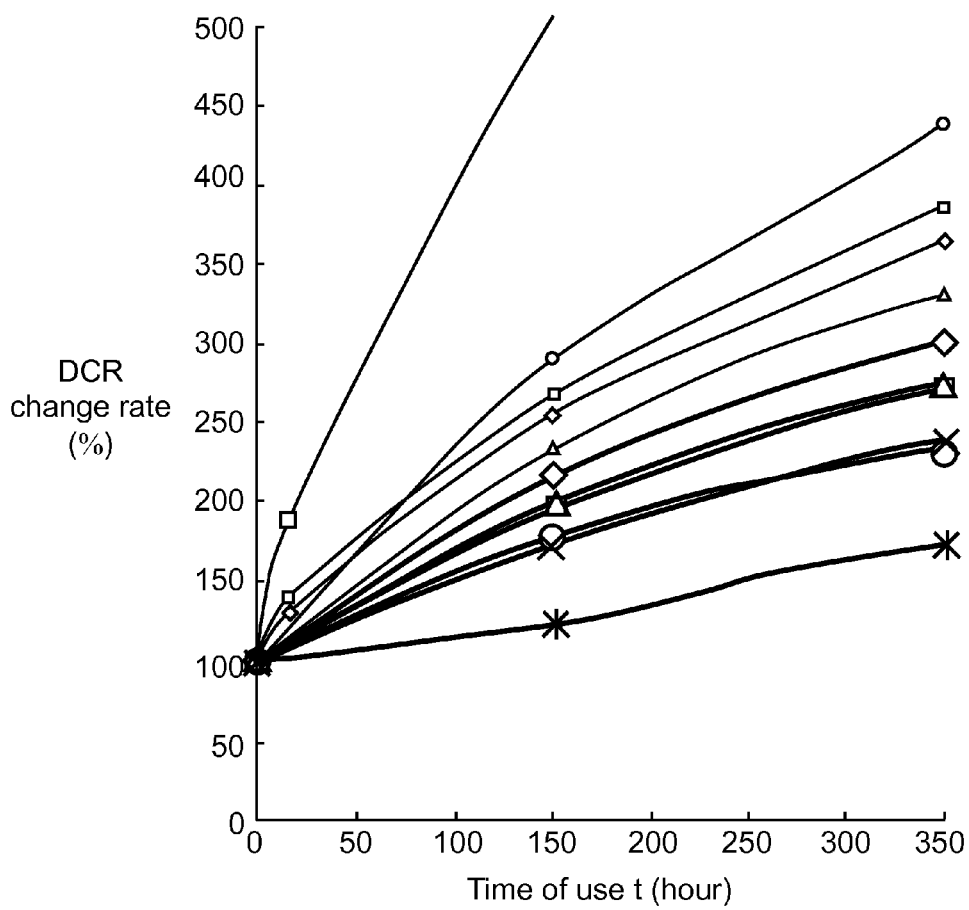
FIG. 3 is a graph showing a relation between a voltage application time and a DCR change rate in capacitors produced in various conditions and capacitors of comparative examples in capacitors in accordance with an exemplary embodiment of the present invention.

Hereinafter, results of the performance evaluation test with respect to the above-mentioned samples 1 to 6 and comparative examples 1 to 5 are described with reference to Table 1 and FIG. 3. Table 1 shows the initial properties at room temperature of capacitors of samples 1 to 6 and comparative examples 1 to 5 in this exemplary embodiment. FIG. 3 is a graph showing a relation between a voltage application time and a DCR change rate in capacitors produced in various conditions and capacitors of comparative examples in capacitors in accordance with an exemplary embodiment of the present invention. In more detail, FIG. 3 shows the relation between a period of time in which a constant voltage of 2.8 V is continued to be applied in the atmosphere at a temperature of 60° C. and the change rate of direct current resistance (DCR) measured at room temperature in the capacitors of samples 1 to 6 and comparative examples 1 to 5 in this exemplary embodiment.

TABLE 1

| | Initial property DCR (%) ref. ratio Room temperature |
|---|---|
| Sample 1 (0.5 V oxidation + conductive layer) | 91.3 |
| Sample 2 (1 V oxidation + conductive layer) | 87.2 |
| Sample 3 (3 V oxidation + conductive layer) | 79.8 |
| Sample 4 (5 V oxidation + conductive layer) | 97.6 |
| Sample 5 (10 V oxidation + conductive layer) | 101.5 |
| Sample 6 (30 V oxidation + conductive layer) | 176.6 |
| Comparative Example 1 (without treatment, only etched foil) | 100.0 |
| Comparative Example 2 (etched foil + conductive layer) | 102.1 |
| Comparative Example 3 (only 1 V oxidation) | 93.0 |
| Comparative Example 4 (only 3 V oxidation) | 197.3 |
| Comparative Example 5 (only 5 V oxidation) | 586.1 |

In FIG. 3, in comparison of samples 1 to 6 and comparative examples 1 to 5, deterioration of DCR after a long time of use at room temperature can be suppressed in samples 1 to 6 as compared with comparative example 1 in which neither anodization nor formation of conductive layer is carried out and comparative example 2 in which only a conductive layer is formed. Furthermore, in Table 1, when samples 2 to 4 are compared with comparative examples 3 to 5 in which only anodization is carried out and only a film having the same thickness as that of samples 2 to 4 is provided, it is shown that samples 2 to 4 can reduce the initial DCR at room temperature by providing a conductive layer. Furthermore, it is shown that samples 1 to 5 can reduce the initial DCR at room temperature as compared with comparative example 1.

In comparative example 5 in which a conductive layer is not provided and anodization is carried out at an anodization voltage of 5V, the value of the initial DCR at room temperature is extremely increased. In examples 3 to 6 in which a conductive layer is provided and anodization is carried out at an anodization voltage of 5 V or more, it is shown that the value of the initial DCR at room temperature is kept being reduced and the increase of DCR after a long time of use is suppressed. This is because when a conductive layer having high conductivity is coated on a film, a conductive layer enters the film, and the amount of activated carbon energizing a collector via the conductive layer is increased, and resistance is reduced as compared with a configuration in which only a film is formed. Furthermore, a film that is inactive with respect to an electrolytic solution is brought into close contact with the surrounding of the conductive layer that enters the film. Therefore, unlike a conventional conductive layer that enters a spontaneous oxide film, in samples 3 to 6, the conductivity is increased by the formation of a conductive layer, and then the reactivity of the collector existing around the entering conductive layer with an electrolytic solution becomes lower. Thus, performance deterioration can be suppressed than conventionally. This largely appears as a difference of the DCR change rate.

From the above-mentioned performance evaluation test, in order to obtain an effect of suppressing the initial DCR and reducing the deterioration of DCR after a long time of use relative to comparative example 1, it is preferable that an anodization voltage is not more than about 5V and a conductive layer is provided on a film having a thickness of not less than 7 Å and not more than 70 Å.

Herein, in the above-mentioned performance evaluation test, there is no difference between the initial DCR of comparative example 2 in which a conductive layer is provided on the surface of an etched foil having a spontaneous oxide film thereon and the initial DCR of comparative example 1. This point is described below.

As described in this exemplary embodiment, the etching treatment is a surface treatment method by which concavity and convexity are provided on the surface of a member.

In comparative example 1, fine activated carbon is contained in at least a part of a concave portion of concavity and convexity provided on a collector from the upper side of a spontaneous oxide film. On the contrary, in comparative example 2, a conductive layer is provided in the concave portion. In comparative example 2, since this conductive layer fills the space of the concave portion formed by etching treatment, it is necessary to energize between activated carbon and the inner surface of the concave portion via the conductive layer and the spontaneous oxide film. The reason why there is not a large difference between the initial DCR of comparative example 1 and that of comparative example 2 is because an effect that the conductivity of the etched collector is improved is cancelled by the inhibition of energization due to the presence of the conductive layer provided between activated carbon and the concave portion.

(Performance Evaluation Test 2)

Following performance evaluation test 1 in which a life test is carried out in the atmosphere at a temperature of 60° C., performance evaluation test 2 is carried out. In performance evaluation test 2, a life test is carried out in the atmosphere at a higher temperature (85° C.).

As sample 7, an electric double layer capacitor having the same configuration as that of sample 4 (anodized at 5 V and a conductive layer is formed) in performance evaluation test 1 is used.

As sample 8, an electric double layer capacitor having the same configuration as that of sample 5 (anodized at 10 V and a conductive layer is formed) in performance evaluation test 1 is used.

As comparative example 6, an electric double layer capacitor having the same configuration as that of comparative example 1 (only an etched foil is provided) in performance evaluation test 1 is used.

As the test conditions, 2.5 V of constant voltage is continued to be applied at a temperature of 85° C. Then, the DCR change rate in samples 7 and 8 as well as comparative example 6 are measured. The results are shown in FIG. 4.

Figure 4:
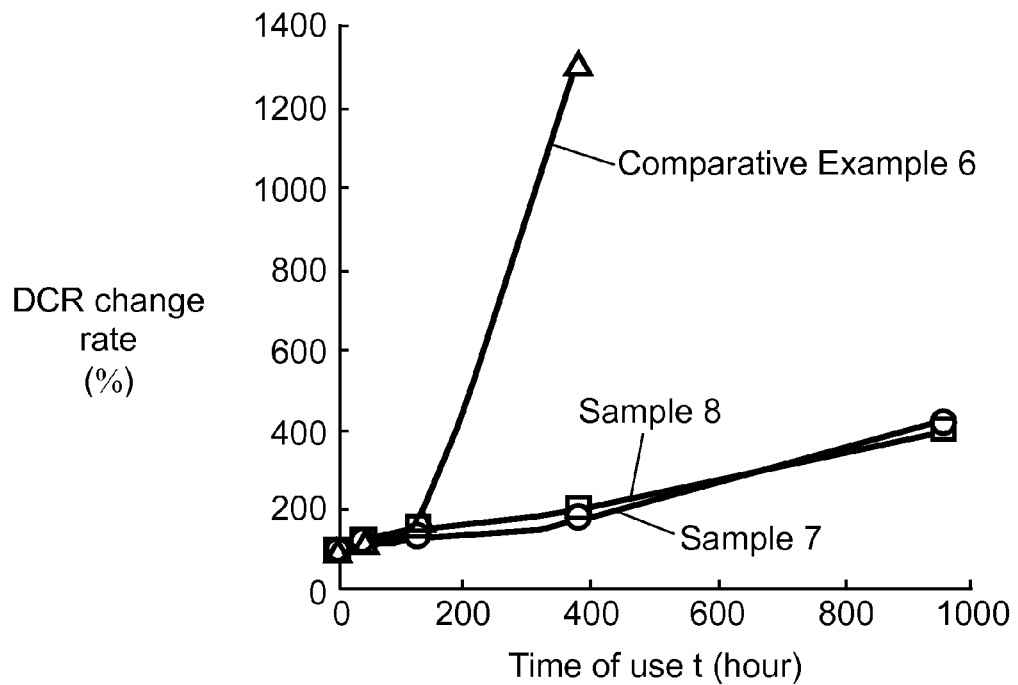
FIG. 4 is a graph showing a relation between a voltage application time and a DCR change rate in another condition in capacitors produced in various conditions and a capacitor of a comparative example in capacitors in accordance with an exemplary embodiment of the present invention.

FIG. 4 is a graph showing a relation between a voltage application time and a DCR change rate in another condition in capacitors produced in various conditions and a capacitor of a comparative example in capacitors in accordance with an exemplary embodiment of the present invention. In more detail, FIG. 4 is a graph showing the relation between a voltage application time and a DCR change rate in the above-mentioned samples 7 to 8 and comparative example 6. In FIG. 4, it is shown that the difference between samples 7 to 8 and comparative example 6 becomes clearer when they are used in an atmosphere at higher temperature and for a longer time.

That is to say, as shown in FIG. 4, in comparative example 6 having a configuration in which only a collector of an etched film is provided and a constant voltage is continued to be applied in temperature atmosphere, sudden deterioration of DCR is confirmed. On the contrary, in samples 7 and 8 having a configuration in which a film is provided on the surface of a collector and further a conductive layer is provided thereon, even in a high-temperature condition and after a long time of use, it is shown that performance deterioration is small and thus, the effect of suppressing performance deterioration is large.

(Performance Evaluation Test 3)

In the present invention, performance evaluation test 3 is carried out for examining the deterioration suppression property of a film when adipic acid or a boron compound is used in anodization.

The evaluation is carried out by using an aluminum foil sample having a size of 20 mm×25 mm, which is impregnated with an ammonium adipate (AA) solution and anodized with a voltage of 3V applied (hereinafter, referred to as "sample 9"), and an aluminum foil having the same size, which is impregnated with a PM solution and anodized with a voltage of 3V applied (hereinafter, referred to as "comparative example 7"). Sample 9 and comparative example 7 are impregnated with an AA solution in the atmosphere at a temperature of 95° C. for one hour, and a constant current is allowed to flow to sample 9 and comparative example 7 for five minutes respectively, followed by measuring a voltage. Then, the ratio of the withstand voltage of before and after sample 9 and comparative example 7 are impregnated with an AA solution (after impregnation/before impregnation) is shown and evaluated. When the test is carried out in the above-mentioned conditions, it is not necessary to construct a capacitor for tests. It is possible to examine the trend of the reactivity of a film having each composition with an electrolytic solution when the film is formed on the collector, for a short time and with simple equipment.

Figure 5:
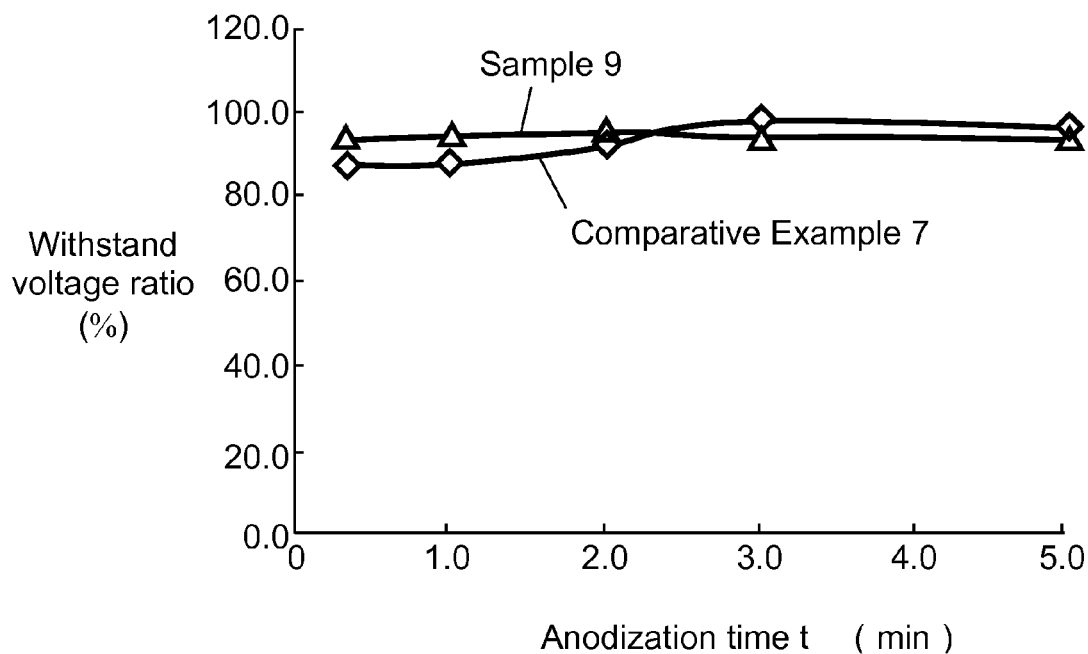
FIG. 5 is a graph showing a deterioration trend of films produced in various conditions with respect to a withstand voltage in capacitors in accordance with an exemplary embodiment of the present invention.

The results of the test carried out in the above-mentioned conditions are shown in FIG. 5 in which oxidation time in anodization is shown in axis of abscissas. FIG. 5 is a graph showing a deterioration trend of films produced in various conditions with respect to a withstand voltage in capacitors in accordance with an exemplary embodiment of the present invention. In more detail, FIG. 5 shows a deterioration trend with respect to the withstand voltage in the above-mentioned sample 9 and comparative example 7.

In FIG. 5, when sample 9 and comparative example 7 are compared with each other, it can be said that they show substantially the same performance although there are some differences depending upon the oxidation time. Incidentally, a film obtained from a solution of an adipic acid compound and a film obtained from a boron compound are similar to each other in physical property and deterioration suppression property of a capacitor. Therefore, the result that a film containing phosphorus and aluminum as in comparative example 7 and a film containing carbon and aluminum obtained from an AA solution as in sample 9 have the same performance is also applied to a film containing boron and aluminum.

Note here that an electrode of a capacitor of the present invention can be used not only for a capacitor element having a winding shape but also for a capacitor element having a laminated shape or a zigzag shape.

Furthermore, a capacitor of the present invention is described by using an electric double layer capacitor, but the capacitor is not limited to this. For example, a film containing phosphorus can be provided on the surface of a collector in an electrode of an electrochemical capacitor capable of absorbing lithium ions to the inside of the carbon material provided on the surface of the collector of the negative electrode. As an example, also when a copper foil is used for a collector of the negative electrode and an aluminum foil is used for a positive collector, by forming a film on the surface of the positive collector and further providing a conductive layer on the film, the same effect as that of the above-mentioned electric double layer capacitor can be obtained.

From the above-mention, in a capacitor of this exemplary embodiment, when a polarizable electrode layer is formed as an electrode portion on at least one side of a collector composed of a metal foil having high reactivity with respect to a driving electrolyte, a film containing phosphorus and a metal constituting a collector is previously provided and a conductive layer is provided on the film. Furthermore, on the surface of a collector on which a film and a conductive layer are provided, a polarizable electrode layer is provided.

Thus, since a film provided on a collector of each of the positive electrode and the negative electrode has a low reactivity with respect to a driving electrolyte, it is possible to suppress a reaction between the driving electrolyte and the collector when charge and discharge are repeated. Therefore, it is possible to suppress performance deterioration such as increase in DCR or capacitance reduction in the capacitor after a long time of use. Furthermore, a film provided on each collector has not more than about 140 Å, a conductive layer enters a film by the physical property of the film. Therefore, as compared with a configuration in which a conductive layer is provided on the surface of a collector provided with a conventional spontaneous oxide film, the initial DCR can be reduced.

INDUSTRIAL APPLICABILITY

The present invention suppresses performance deterioration of a capacitor after a long time of use by disposing a conductive layer on a film provided on both sides or one side of a collector. Therefore, it is useful for energy regeneration of vehicles or for a power source of an electronic device, which has long product life span and requires rapid charge and discharge.

The invention claimed is:
1. A capacitor comprising:
   a positive electrode;
   a negative electrode;
   a separator disposed between the positive electrode and the negative electrode, wherein
   at least one of the positive electrode and the negative electrode includes:
      a collector made of metal;
      a film disposed on the collector, the film including at least one of $Al(PO_4)$, $Al_2(HPO_4)_3$ and $Al(H_2PO_4)_3$;
      a conductive layer disposed on the film; and
      an electrode portion disposed on the conductive layer.
2. The capacitor of claim 1,
   wherein the collector is an etched foil.
3. The capacitor of claim 1,
   wherein the conductive layer includes a conductive material and a binder.
4. The capacitor of claim 3,
   wherein the conductive layer includes the conductive material and the binder at a missing rate from 2:1 to 10:1.
5. The capacitor of claim 3,
   wherein the conductive material is acetylene black and the binder is ammonium salt of caboxymethylcellulose in the conductive layer.
6. The capacitor of claim 1,
   wherein the film is formed by anodizing the collector with an anodization voltage ranging from 0.5 V to 5 V, inclusive.
7. The capacitor of claim 6,
   wherein the anodization voltage of the film is in a range from 1 V to 3 V, inclusive.
8. The capacitor of claim 1,
   wherein a thickness of the film is in a range from 7 Å to 70 Å.
9. A method for manufacturing a capacitor, the method comprising:
   forming a collector made of metal;
   immersing the collector or subjecting the collector to anodization in a solution to form a film on the collector;
   forming a conductive layer on the film; and
   forming an electrode portion on the conductive layer, wherein
   the solution contains a phosphorus compound, and
   the film includes at least one of $Al(PO_4)$, $Al_2(HPO_4)_3$ and $Al(H_2PO_4)_3$.
10. The capacitor of claim 9,
    wherein a thickness of the film is in a range from 7 Å to 70 Å.
11. The method for manufacturing a capacitor of claim 9,
    wherein the conductive layer includes a conductive material and a binder.
12. The method for manufacturing a capacitor of claim 11,
    wherein the conductive material is acetylene black and the binder is ammonium salt of caboxymethylcellulose in the conductive layer.
13. The method for manufacturing a capacitor of claim 11,
    wherein the conductive layer includes the conductive material and the binder at a mixing rate from 2:1 to 10:1.
14. A capacitor comprising:
    a positive electrode;
    a negative electrode; and
    a separator disposed between the positive electrode and the negative electrode, wherein
    at least one of the positive electrode and the negative electrode includes:
       a collector made of metal;
       a film disposed on the collector, the film including adipic acid;
       a conductive layer disposed on the film; and
       an electrode portion disposed on the conductive layer.
15. The capacitor claim 14,
    wherein the collector is an etched foil.
16. The capacitor claim 14,
    wherein the conductive layer includes a conductive material and a binder.
17. The capacitor of claim 16,
    wherein the conductive layer includes the conductive material and the binder at a mixing rate from 2:1 to 10:1.
18. The capacitor of claim 16,
    wherein the conductive material is acetylene black and the binder is ammonium salt of caboxymethylcellulose in the conductive layer.
19. The capacitor of claim 14,
    wherein the film is formed by anodizing the collector with an anodization voltage ranging from 0.5 V to 5 V, inclusive.
20. The capacitor of claim 14,
    wherein a thickness of the film is in a range from 7 Å to 70 Å.

* * * * *